(12) United States Patent
Eschbach et al.

(10) Patent No.: US 8,269,987 B2
(45) Date of Patent: Sep. 18, 2012

(54) USING APPLICATION SIDE TRUETYPE OR OTHER OUTLINE FONTS TO CREATE SPECIALTY IMAGING FONTS ON DIGITAL FRONT-END

(75) Inventors: Reiner Eschbach, Webster, NY (US); Sharon A. Krueger, Penfield, NY (US); James R. Low, Rochester, NY (US); William A. Fuss, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1071 days.

(21) Appl. No.: 11/928,531

(22) Filed: Oct. 30, 2007

(65) Prior Publication Data

US 2009/0109460 A1 Apr. 30, 2009

(51) Int. Cl.
G06K 15/02 (2006.01)
G06K 1/00 (2006.01)
G06F 3/12 (2006.01)
G06F 15/00 (2006.01)

(52) U.S. Cl. .......................... 358/1.11; 358/1.1; 358/1.9
(58) Field of Classification Search .................. None
See application file for complete search history.

(56) References Cited

U.S. PATENT DOCUMENTS

| 5,617,528 | A * | 4/1997 | Stechmann et al. .......... 715/201 |
| 7,092,128 | B2 | 8/2006 | Wang et al. |
| 7,126,721 | B2 | 10/2006 | Wang et al. |
| 7,148,999 | B2 | 12/2006 | Xu et al. |

(Continued)

FOREIGN PATENT DOCUMENTS

JP 09193489 A * 7/1997

OTHER PUBLICATIONS

JP-09193489 Patent Translation.*

(Continued)

*Primary Examiner* — Fan Zhang
(74) *Attorney, Agent, or Firm* — Fay Sharpe LLP

(57) ABSTRACT

A document printing method includes receiving a print job of electronic document data representing a document including a security character string with at least one character defined in the electronic document data in terms of a security mark creation font. The security mark creation font is a scalable outline based font, wherein the security character string is defined with a selected security effect, and wherein the security mark creation font provides an indication of the selected security effect without implementing the security effect. An SI Font is selected that corresponds to the security mark creation font of the at least one character of the security character string. The SI Font includes a bitmap representation of the at least one character of the security character string. The SI Font is suitable for printing the security character string with the selected security effect. The step of selecting an SI Font includes selecting the SI Font based upon a unique name of the SI Font that corresponds to a name of the security mark creation font, and also includes selecting the SI Font based upon at least one other attribute of the security mark creation font. A font substitution is performed in which the selected SI Font is used to define the security character string in the electronic document data in place of the security mark creation font. After the font substitution, a hard copy output of the document is printed as defined by the electronic document data including the substituted SI Font. A system is disclosed for performing the document printing method.

8 Claims, 3 Drawing Sheets

U.S. PATENT DOCUMENTS

| | | |
|---|---|---|
| 7,197,706 B1 * | 3/2007 | Berson et al. ............. 715/234 |
| 2003/0174135 A1 * | 9/2003 | Gyllenskog et al. ......... 345/471 |
| 2003/0231349 A1 | 12/2003 | Wang et al. |
| 2004/0114160 A1 | 6/2004 | Wang et al. |
| 2005/0128523 A1 | 6/2005 | Liu et al. |
| 2006/0072159 A1 | 4/2006 | Eschbach et al. |
| 2007/0097384 A1 * | 5/2007 | Hashimoto ............... 358/1.2 |
| 2007/0139681 A1 | 6/2007 | Eschbach et al. |
| 2008/0295983 A1 * | 12/2008 | Krietsch et al. ............. 162/110 |

OTHER PUBLICATIONS

JP-09193489 Abstract.*

* cited by examiner

USING APPLICATION SIDE TRUETYPE OR OTHER OUTLINE FONTS TO CREATE SPECIALTY IMAGING FONTS ON DIGITAL FRONT-END

CROSS-REFERENCE TO RELATED APPLICATIONS

Cross reference is made to the following co-pending applications: Ser. No. 11/314,509 filed Dec. 21, 2005 and entitled "Printed Visible Fonts with Attendant Background in the name of co-inventors Reiner Eschbach, James R. Low, William Fuss, and Shen-ge Wang; Ser. No. 11/313,397 filed Dec. 21, 2005 and entitled "Variable Differential Gloss Font Image Data" in the name of co-inventors Reiner Eschbach, James R. Low, William Fuss, and Shen-ge Wang; and, Ser. No. 10/954,125 filed Sep. 29, 2004 and entitled "VARIABLE DATA DIFFERENTIAL GLOSS IMAGES" in the name of James R. Low, Reiner Eschbach, Zhigang Fan, William Fuss, and Shen-ge Wang, and the disclosures of each of these prior co-pending applications are hereby incorporated by reference into the present specification.

Reference is also made to the following granted patents, the disclosures of which are hereby incorporated by reference into the present specification: U.S. Pat. No. 7,092,128, entitled "APPLICATION OF GLOSSMARKS FOR GRAPHICS ENHANCEMENT" to inventors Shen-ge Wang, Beilei Xu, and Chu-heng Liu; U.S. Pat. No. 7,180,635, entitled "HALFTONE IMAGE GLOSS CONTROL FOR GLOSSMARKS", to inventors Shen-ge Wang, Beilei Xu, and Chu-heng Liu; U.S. Pat. No. 7,148,999, entitled "VARIABLE GLOSSMARK" to inventors Beilei Xu, Shen-ge Wang, and Chu-heng Liu; and U.S. Pat. No. 7,126,721, entitled "PROTECTING PRINTED ITEMS INTENDED FOR PUBLIC EXCHANGE WITH GLOSSMARKS" to inventors Shen-ge Wang, Beilei Xu, and Chu-heng Liu. The appropriate components and/or processes of said co-pending application and/or any of said granted patents can be implemented in the present development as deemed necessary and appropriate to one of ordinary skill in the art.

BACKGROUND

As disclosed in the above-referenced patent applications and issued patents, it is generally known to define a font for security applications by creating a bitmap representation of each font character and storing same for use in a variable printing environment, e.g., Variable Data Intelligent Postscript Printware VIPP or Personalized Print Markup Language (PPML) or the like. Examples of such specialty imaging bitmap fonts (SI Fonts) include but are not limited to:

a gloss mark font in which each character is defined against a same-color background grey level, wherein the background and character are defined using respective anisotropic halftone dot structures that allows for human perception of the character at certain viewing angles without being susceptible to useful reproduction by digital or analog copying;
 a microtext font in which each character is defined at a size of less than 1 point, i.e., a height of less than about 0.3527 mm so as to be readable only with a loupe or magnifying glass;
 a correlation mark font in which the printed characters are visible only when a transparency key (often a 50% checkerboard grid pattern) is overlaid on the page.

The above mentioned examples of bitmapped effect fonts for document security—referred to generally in the following description as "SI Fonts" or in some cases as "security mark fonts"—are combined as Specialty Imaging feature in the Xerox Free Flow Variable Imaging Suite. In such case, each character of the SI Font is precisely defined by a bitmap image to ensure proper placement of the ink/toner dots so that the desired effect is assured. In one known arrangement, an SI Font for use in a gloss mark, microtext or correlation mark application is embedded or encapsulated in a PostScript Type 3 font format and saved at the printer, i.e., in the digital front-end (DFE) for use in such printing applications.

Those of ordinary skill in the art will recognize that a limitation of the above arrangement is that the bitmaps, e.g., embedded in a Type 3 font, are not scalable, rotatable, colorable, or otherwise able to be manipulated due to their specialized nature to create optical effects or other special characteristics. Users, however, are accustomed to modify attributes in the manner of an outline font such as TrueType font (TTF) or other outline (curve) based font, e.g., Adobe Type 1 font. Instead, each SI Font type (e.g., micro_f6-5, NeueClassic_GL) and size (0.84 point, 10 point, 12 point, 14 point) and must be pre-defined and pre-stored as a new SI Font for use as needed during printing operations. Correspondingly, a user of a document production application desiring to use one of these SI Fonts in an electronic document must be sufficiently knowledgeable in these font details in order to select the correct type and size and color of font for insertion into a security mark field. This can be confusing in that gloss mark and other security marks fonts are often sized in fractional point sizes and with other attributes that could be misunderstood by users. If a variable text security mark field of a document is set to receive a security mark string of characters of a given font type, font size and font color, any deviation of the SI Font selection by the user could cause the security mark to be ineffectively printed. For example, if a security mark field of a document is set to receive 18 point security characters, user selection of NeueModem_GL__19.2 font for a security mark character string (a gloss mark font based upon NeueModem font sized at 19.2 point) would result in moiré in the rendered output.

In addition, not all input font sizes can be realized as output SI Font characters due to stitching and alignment requirements. Using the GlossMark™ Font as exemplar, FIG. 1 is one example of a table relating given input font sizes IF in terms of points to gloss mark output font sizes OF in terms of points (although actual character height is not changed, bounding boxes and other font metrics are changed leading to point size variations from input to output). It can be seen that this point size variation is significant and will lead to rendered output problems if not properly resolved.

These issues and idiosyncrasies are a main reason why use of gloss mark and other SI have heretofore been best suited for VIPP or PPML user applications in which a single field is automatically associated with the correct pre-defined font settings that are not readily variable by a user so that the specified security mark text/string is rendered correctly when printed. Accordingly, a need has been realized for a VIPP or PPML application in which a user is seemingly given wide latitude and control of font selection for security mark text in a simplified manner that allows the user to differentiate and easily manipulate the security mark text on his/her computer screen/monitor (referred to herein as a "security mark creation font", but in which the user specifications are then checked before printing to allow for the appropriate font substitutions, including font size and/or font color substitutions, to be made at print time to select the corresponding SI Font for printing that most closely corresponds to the security mark creation font to ensure properly rendered printed output and the quality of the resulting security mark in the resulting printed document.

SUMMARY

In accordance with one aspect of the present development, a document printing method includes receiving a print job of electronic document data representing a document including a security character string with at least one character defined in the electronic document data in terms of a security mark creation font. The security mark creation font is a scalable outline based font, wherein the security character string is defined with a selected security effect, and wherein the security mark creation font provides an indication of the selected security effect without implementing the security effect. An SI Font is selected that corresponds to the security mark creation font of the at least one character of the security character string. The SI Font includes a bitmap representation of the at least one character of the security character string. The SI Font is suitable for printing the security character string with the selected security effect. The step of selecting an SI Font includes selecting the SI Font based upon a unique name of the SI Font that corresponds to a name of the security mark creation font, and also includes selecting the SI Font based upon at least one other attribute of the security mark creation font. A font substitution is performed in which the selected SI Font is used to define the security character string in the electronic document data in place of the security mark creation font. After the font substitution, a hard copy output of the document is printed as defined by the electronic document data including the substituted SI Font.

In accordance with another aspect of the present development, a document printing system includes means for displaying an electronic document including a security string with at least one character defined in a security mark creation font to have a security effect. The security mark creation font provides a visible indication of the presence of the security effect without visually implementing the security effect. The security mark creation font is a scalable outline based font. The system further includes means for receiving a print job comprising electronic document data representing the displayed electronic document including the security character string defined in the electronic document data in terms of the security mark creation font. Means are provided for selecting an SI Font that corresponds to the security mark creation font of the at least one character of the security character string, wherein the SI Font comprises a bitmap representation of the at least one character of the security character string. The system includes means for performing a font substitution in which the selected SI Font is used to define the security character string in the electronic document data in place of the security mark creation font. Means are provided for printing a hard copy output of said document as defined by said electronic document data including said substituted SI Font.

BRIEF DESCRIPTION OF DRAWINGS

The development comprises various steps and/or components and/or arrangements of same, embodiments of which are illustrated in the accompanying drawings that form a part hereof, wherein.

DETAILED DESCRIPTION

Font sizes are commonly specified in the unit "points", however, this unit does often not directly refer to a characteristic of the font that an unskilled user can easily identify. FIG. 1A shows the case of the character "M" using identical point size settings, but different font designs. This difference is caused by the historical naming convention of fonts that is based on the height of the lead or wood the font character was created on. Normally this attribute is not distracting since the user 'sees' the actual size on the screen. Heretofore, when using SI Fonts, a name-based font substitution has been performed between user screen display and the actual rendered print and in some designs, this font substitution based on name only causes a change in visual font height that is detrimental to the design as rendered in the printed document. It is important to note, from FIG. 1A, that a font substitution that also substitutes based on a specified font size in addition to a specified font name can be advantageously used in a tuned system in accordance with the present development as described hereinbelow.

Figure 2:
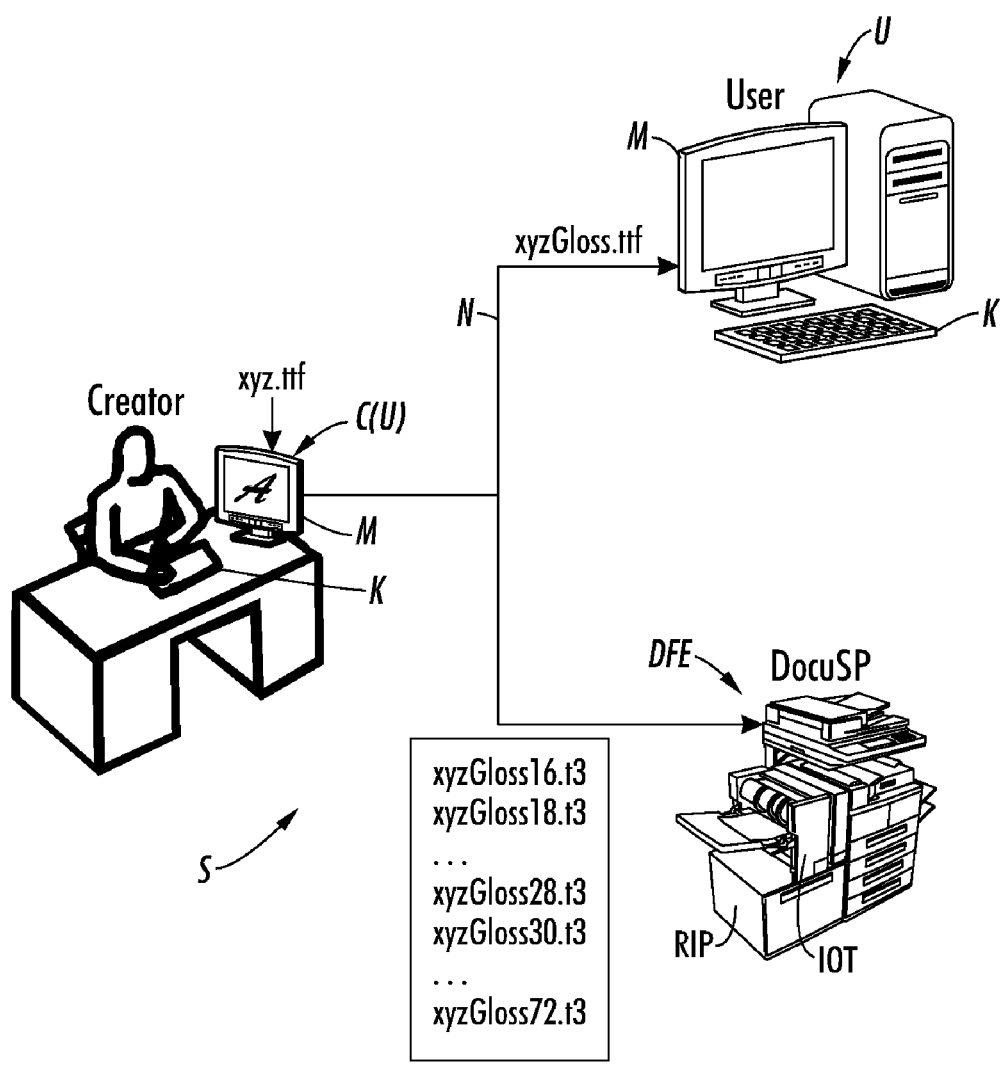
FIG. 2 diagrammatically illustrates the present development, wherein a TrueType font (TTF) or other scalable, rotatable and/or colorable outline-based font is created and/or installed for use in a variable printing application on a computer workstation as a "security mark creation font," and a plurality of corresponding "security mark printing fonts" are created and/or installed on the digital front end (DFE) of a printer, wherein each stored security mark printing font comprises a pre-stored bitmap representation of each character of the security mark creation font for a given size, color and/or rotation of the security mark creation font.

FIG. 2 illustrates a digital imaging system S in accordance with the present development, including one or more user computers or workstations U for user creation and editing of electronic documents that include at least one variable security field or security mark field, i.e., a document field adapted to receive a variable character string comprising one or more font characters used for security purposes to prevent effective counterfeiting. Each user workstation U can be a general purpose or "personal" computer or a terminal or the like and comprises a keyboard, touchpad or the like K for input of text or other characters and a display monitor M for display of the electronic document being created. The electronic document represents and defines an actual hard-copy document to be printed.

The user workstation U comprises or is operably connected to an electronic storage medium for storage of font data, in particular TrueType Font (TTF) or other outline font data. Each user workstation is connected directly or through a network N to a digital front-end DFE device provided by a programmed general purpose computer or a special purpose computer, e.g., a XEROX DocuSP DFE, which includes a Raster Image Processor (RIP) that controls an image output terminal IOT that prints a hard copy output of the electronic document on paper or other recording media, e.g., a xerographic or other printing device such as a monochrome or multi-color (e.g., CMYK) printer.

Figure 2A:
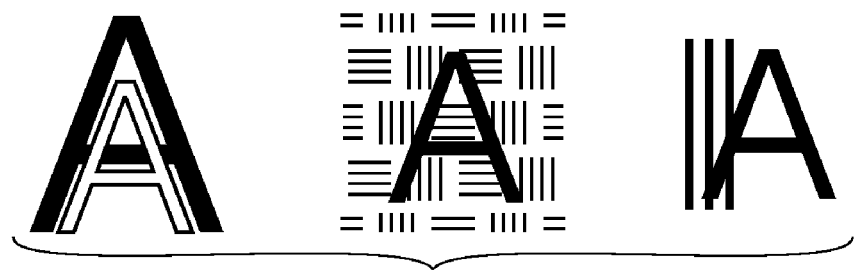
FIG. 2A shows three exemplary forms of designing a special effect creation font that allows readability of the character, while simultaneously indicating the effect nature; and, FIG. 3 diagrammatically illustrates a font substitution process in accordance with the present development in which a security mark creation font character in an electronic document data file is replaced by a corresponding SI Font character for printing.

According to the present development, a security mark creation font such as an Adobe Type 1 font or a TrueType font (TTF) or other scalable, rotatable and/or colorable outline font for insertion of and/or editing of a security character string (i.e., a string of one or more font characters including letters, numbers and/or symbols in any language) into an electronic document is created and/or installed on each user workstation U, either by way of the user workstation U itself or, as show in FIG. 2, by another similar "creator" workstation C connected to the network N. Here it is preferred that the security mark creation font is visually identifiable on the workstation so that first the rendered text can be recognized, but that second also an indication is given that the selected font is an SI Effect Font. This is shown in FIG. 2A, where the letter "A" is identifiable, while simultaneously the effect nature (i.e., the type of SI Font) is indicated by the three different exemplary visual style modifications that are displayed on the monitor M of the user workstation U so that the user is aware that security mark creation font has been specified as opposed to a non-security font such as used for ordinary text, even through the corresponding security effect (gloss mark, microtext, correlation mark) is not actually displayed to the user. In FIG. 2A, by way of example only, the three visual styles V1, V2, V3 are used to indicate a security mark creation font for microtext, gloss mark text and correlation mark text, respectively. Note that the letters and other characters of the security mark creation font should be identifiable on the monitor M of the user workstation for positioning and spelling purpose, but do not need to be easily readable since the security mark creation font is only used as a placeholder in the design process. When the security mark creation font is generated and/or installed on the user workstation U, the creator workstation C or the receiving user workstation U creates and stores on the DFE a plurality of SI Fonts (or security mark printing fonts), each of which comprises a pre-stored bitmap representation of each character of the security mark creation font for a given size, color and/or rotation of the security mark creation font. For each of a plurality of font attribute variations (e.g., size, color and/or rotation) of the installed security mark creation font that are available to the user using an electronic document creation/editing software package, such as a VIPP or PPML package, a corresponding SI Font is created and saved on the DFE with a unique name. Thus, as shown in the example of FIG. 2, if the security mark creation font is a gloss mark creation TrueType font named "xyzGloss.ttf" and is sizeable on the display monitor M of the user workstation U in a range of 16 point to 72 point, e.g., with 30 possible point size selections as controlled by the document creation/editing software package, 30 new corresponding SI Fonts (one for each possible user-selected size) are defined, each including a bitmap definition of the indicated size of the full character set of the "xyzGloss.ttf" font. The SI Fonts are correspondingly named, e.g., "xyzGloss16.t3" corresponding to the "xyzGloss.ttf" font sized at 16 point and stored as a Type 3 (t3) font, "xyzGloss18.t3" corresponding to the 18 point size of the "xyzGloss.ttf" font, etc. The same applies for all other allowed user attribute variations of the security mark creation font on the user workstation U, such as font color and font rotation. Thus, for example, if the electronic document creation/editing software package in use on a user workstation U allows the security mark creation font "xyzGloss.ttf" to be used in a landscape (90 degree) rotation at size 24 point in a color C1, an SI Font corresponding to this combination of attributes will be created and stored on the DFE and uniquely named, e.g., as "xyzGloss24_C1_rotate90.t3" and will include a bitmap representation of each character in the "xyzGloss.ttf" font definition as adjusted to include the specified size, color and/or rotation attributes.

According to the present development, when the user workstation U sends electronic document print job data representing a document such as a show or game ticket, stock certificate, employee badge, or any other printed document or printed card or other item to the DFE for printing on the image output terminal IOT, the RIP of the DFE processes the electronic document data to identify all occurrences of the security mark creation font and performs a font substitution in the RIP to remove the user-specified security mark creation font and insert the corresponding SI Font, using all user-specified font attributes (name, size, color, and/or rotation) to select the corresponding SI Font that is pre-installed on the RIP so that the selected corresponding SI Font can be used for printing, resolving or overriding any conflicts that might arise as described below. Because the bitmap based SI Fonts are known to be rendered correctly when printed by the image output terminal IOT, which is critical for security mark applications, this font substitution process ensures that the user-specified security mark creation fonts are translated to an SI Font that will be correctly printed, while allowing the user to manipulate the security mark creation font on a workstation U in conventional manner without regard to the suitability of the selected font and associated attributes. It should be noted that the font substitution process implemented in the DFE is completely imperceptible by or "transparent" to a user of the workstation U who submitted the electronic document for printing.

Figure 3:
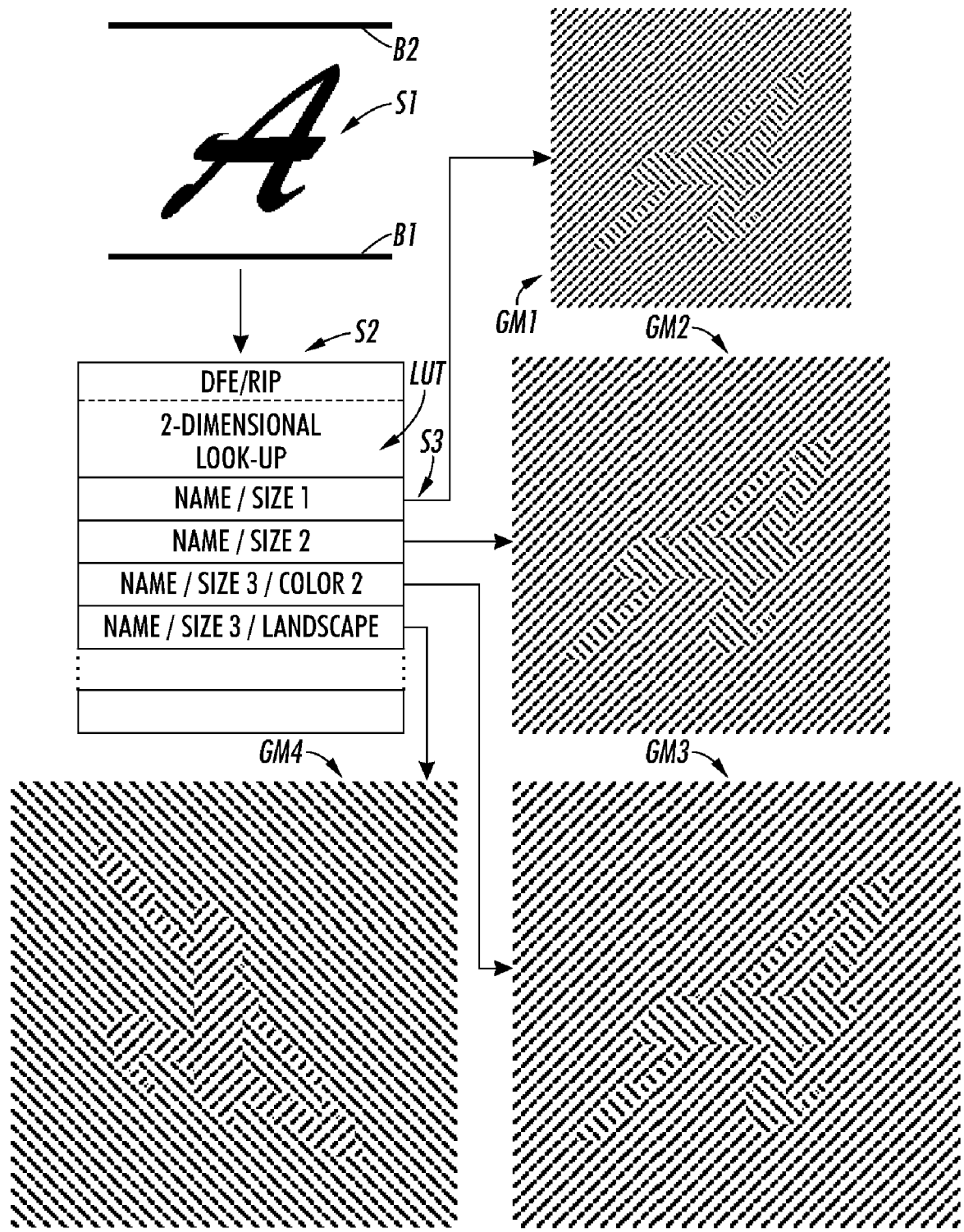

This process is diagrammatically shown in FIG. 3 with respect to a font character "A" of a security mark creation font, in particular, a gloss mark font in this example, but the disclosure applies equally to microtext and correlation mark fonts. As shown at S1, the font character "A" is visible to a user of a user workstation U by display on the display monitor M as part of an electronic document being created/edited. As noted above in relation to FIG. 2A, the font character is displayed on the monitor M with a visible attribute that will not be printed but that indicates to the user that the font character is part of a security mark creation font family, e.g., by displaying the font character in one of the visual styles V1, V2, V3 (FIG. 2A) or in inverse video format or, as shown, by displaying one or more bars B1,B2 adjacent the font character when the font is displayed on the monitor M of the user workstation U.

As shown at S2, the security mark creation font character is sent as part of an electronic print job for the document being created/edited to the DFE, e.g., as a TrueType font or Postscript Type 1 font. In the DFE, the RIP accesses a 2-dimensional look-up table or other means to associate the received print job security mark creation font in the electronic document data to a corresponding pre-defined and pre-stored SI Font to effect the above-described font substitution. The term "2-dimensional" is intended to mean look-up by name and at least one other attribute including size, color, and/or rotation.

FIG. 3 further shows that according to the look-up table (LUT), in this example:

the gloss mark SI Font (bitmap) character indicated at GM1 corresponds to the received gloss mark security creation font character "A" for a first size attribute "size 1" specified in the print job submitted to the DFE;

the gloss mark security mark printing font (bitmap) character indicated at GM2 corresponds to the received gloss mark security creation font character "A" for a second (larger) size attribute "size 2" specified in the print job submitted to the DFE;

the gloss mark security mark printing font (bitmap) character indicated at GM3 corresponds to the received gloss mark security creation font character "A" for a third size attribute "size 3" specified in the print job submitted to the DFE in a non-black color "color 2";

the gloss mark security mark printing font (bitmap) character indicated at GM4 corresponds to the received gloss mark security creation font character "A" for the third size attribute "size 3" specified in the print job submitted to the DFE in the non-black color "color 2", and also rotated 90 degrees for landscape printing "landscape."

Thus, those of ordinary skill in the art will recognize that such security mark font substitution of an SI Font for a security mark creation font based upon at least both name and size allows for a user to manipulate the displayed TrueType or other security mark creation font at the user workstation U in terms of font type/name, size, color, and/or rotation, while the proper printing of the variable security mark character string input by the user at the workstation U is ensured at the RIP by transparent substitution of the SI Font that corresponds to the user-specified name and size/color rotation attributes.

Figure 1:
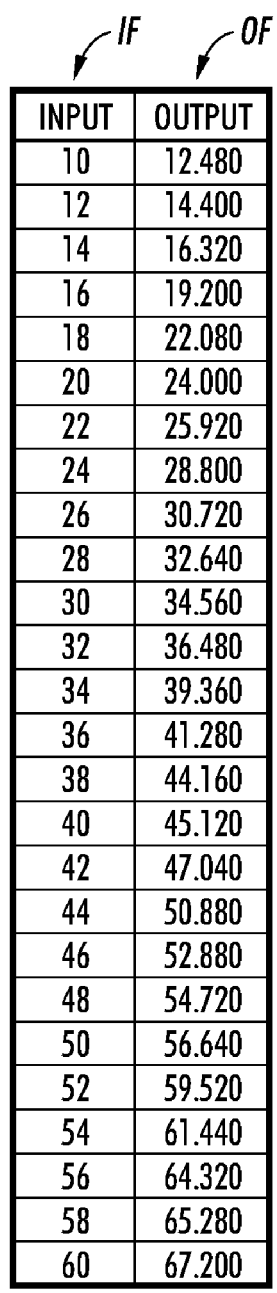
FIG. 1 (prior art) is a table that shows one example of mismatch between user specified input font point sizes for a security mark creation font and actual security mark printing font point sizes.
Figure 1A:
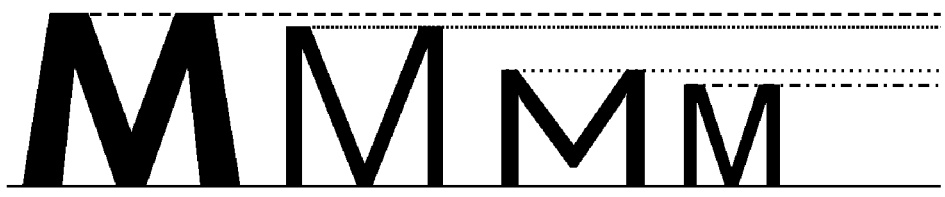
FIG. 1A shows four instances of the letter "M" for four different prior art fonts using identical point size in the user application.

It should be noted that the point size mis-match highlighted in FIGS. 1 and 1A is resolved in the DFE according to the present development in a manner that is also transparent to the user. The main attribute of the font size substitution is the selection of the best visual size match, rather than numerical size used in common user applications, again refer to FIG. 1A for the discrepancy. The user of a workstation U creating a print job including a security mark creation font is preferably only able to "see" and hence select the integer portion of a font point size, but the SI Font substituted in the DFE is defined according to the full, actual output size including the fractional portion. It should also be noted that certain font sizes are impracticable for security applications. For example, gloss mark font sizes are limited at a lower limit by printing and perception limitations and are limited at an upper limit by storage limitations. In another example, a microtext font larger than 1 point is not considered to be microtext. In such cases, where the user specifies a font size (or other attribute) that is impracticable or unsuitable for printing, the DFE is programmed to make a font substitution in accordance with the present development that is the closest usable substitution, with or without a warning to the user at the workstation U or to an operator of the DFE and/or image output terminal IOT.

As noted, each security mark creation font comprises scalable outline definitions, e.g., a TrueType or Type 1 definition, for a plurality of font characters including letters, numbers and/or symbols in any language. Each uniquely named SI Font comprises bitmap definitions for each font character of the corresponding security mark creation font for a certain size, color and/or rotation of each font character.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A document printing method comprising:

creating a security mark creation font comprising a plurality of font character definitions and storing said security mark creation font for use in creating and editing an electronic document, said security mark creation font associated with a security effect and being a scalable outline based font comprising a font name and a plurality of different font sizes;

for each of said plurality of different font sizes of said security mark creation font, creating a unique SI Font related to said font size and comprising a correspondingly sized bitmap representation of each font character definition of said security mark creation font, said bitmap representation of each font character definition including said security effect and being suitable for printing a representation of said font character definition including said selected security effect;

storing each SI Font with a unique name that corresponds to said font name of said security mark creation font such that a plurality of different SI Fonts are stored, each of said stored SI Fonts corresponding to one of said plurality of different font sizes of said security mark creation font, and each including said security effect in said bitmap representation of each font character definition thereof;

receiving a print job comprising electronic document data representing a document including a security character string comprising at least one character defined in said electronic document data in terms of said security mark creation font such that said security character string is associated with said security effect, of said security mark creation font;

using both said font name and font size of said security mark creation font used to define said security character string to select a corresponding one of said plurality of stored SI Fonts that corresponds to the security mark creation font of the security character string;

wherein: said security mark creation font further comprises a plurality of colors and a plurality of rotations;

said step of creating a unique SI Font includes creating a unique SI Font for each of said plurality of colors and each of said plurality of rotations in each of said plurality of font sizes; and, said step of using both said name and size of said security mark creation font used to define said security character string to select a corresponding one of said plurality of stored SI Fonts further comprises also using said color and said rotation of said security mark creation font to select a corresponding one of said plurality of stored SI Fonts;

performing a font substitution in which said security mark creation font used to define said security character string in said electronic document data is replaced by said selected one of said SI Fonts such that each character of said security character string is replaced by said bitmap representation of said character as defined by said selected SI Font, including said security effect;

after said font substitution, printing a hard copy output of said document as defined by said electronic document data including said substituted SI Font such that said hard copy output of said document includes said security character string printed with said security effect.

2. The document printing method as set forth in claim 1, wherein said security mark creation font is stored as a TrueType font or an Adobe Type 1 font.

3. The document printing method as set forth in claim 2, wherein said SI Font is stored as an Adobe Type 3 font.

4. The document printing method as set forth in claim 1, wherein said security effect is one of a gloss mark effect, a correlation mark effect, or a microtext effect.

5. The document printing method as set forth in claim 4, further comprising displaying a representation of said electronic document to a user on a display monitor, before said printing step, wherein said security character string is displayed in a format that indicates the presence of the security mark creation font without displaying said security effect on the display monitor.

6. The document printing method as set forth in claim 5, wherein said display format for said security character string comprises displaying a bar adjacent each character of the security character string.

7. The document printing method as set forth in claim 1, wherein said step of using at least said name and size of said security mark creation font to select a corresponding one of said plurality of stored SI Fonts and said step of performing a font substitution comprises accessing a 2-dimensional lookup table using said name and said size of the security mark creation font to find a corresponding one of said plurality of stored SI Fonts.

8. The document printing method as set forth in claim 7, wherein said security effect comprises one of a gloss mark, a correlation mark, and microtext.

* * * * *